United States Patent [19]
Brown

[11] Patent Number: 5,999,429
[45] Date of Patent: Dec. 7, 1999

[54] BULK FILTER CAPACITOR DISCHARGE IN A SWITCHING POWER SUPPLY

[75] Inventor: Alan E. Brown, Georgetown, Tex.

[73] Assignee: Dell USA, L.P., Round Rock, Tex.

[21] Appl. No.: 08/995,242

[22] Filed: Dec. 19, 1997

[51] Int. Cl.[6] .............................. H02M 5/45; H02M 5/42; H02H 7/122; H02J 3/32
[52] U.S. Cl. ................................ 363/89; 363/37; 363/56; 307/48; 307/66
[58] Field of Search .................................. 307/46, 48, 64, 307/66; 363/34, 37, 89, 44, 55, 56

[56] References Cited

U.S. PATENT DOCUMENTS

| | | | |
|---|---|---|---|
| 4,151,558 | 4/1979 | Manners | 358/190 |
| 4,272,717 | 6/1981 | Bailey | 323/226 |
| 4,275,436 | 6/1981 | Peterson | 363/47 |
| 4,648,015 | 3/1987 | Davis et al. | 363/15 |
| 4,843,533 | 6/1989 | Roof et al. | 363/55 |
| 5,247,230 | 9/1993 | Michaud | 318/17 |
| 5,523,665 | 6/1996 | Deaver | 320/1 |
| 5,572,735 | 11/1996 | Tanikawa | 395/750 |
| 5,631,811 | 5/1997 | Huh | 363/21 |
| 5,666,257 | 9/1997 | Yang | 361/139 |
| 5,671,131 | 9/1997 | Brpwm | 363/56 |
| 5,689,409 | 11/1997 | Scharlach et al. | 363/56 |
| 5,771,162 | 6/1998 | Kwon | 363/56 |

*Primary Examiner*—Peter S. Wong
*Assistant Examiner*—Bao Q. Vu
*Attorney, Agent, or Firm*—Skjerven, Morrill, MacPherson, Franklin Friel, L.L.P.; David G. Dolezal

[57] ABSTRACT

A discharge control circuit for a power supply switching converter that, in response to a cessation of current from an AC power source, makes conductive a main switching element of the switching converter to discharge the bulk filter capacitor through the main switching element to a charge level that meets safety standards. The discharge control unit includes a current limiting circuit for limiting the discharge current through the main switching element in which the rate of rise of the discharge current is controlled with the use of an RC circuit. The discharge control unit also includes a state machine that activates the current limiting circuit in response to a cessation of the modulation mode of the switching converter. The discharge control circuit also includes a reset circuit for placing the state machine in a known state during the startup of the switching converter.

44 Claims, 5 Drawing Sheets

BULK FILTER CAPACITOR DISCHARGE IN A SWITCHING POWER SUPPLY

BACKGROUND OF THE INVENTION

1. Field of the Invention

This invention relates generally to DC power supplies and more specifically for discharging a bulk filter capacitor to a safe charge level after cessation of current supplied from an external power source.

2. Description of the Related Art

Computer systems are information handling systems which can be designed to give independent computing power to one user or a plurality of users. Computer systems may be found in many forms including, for example, mainframes, minicomputers, workstations, servers, personal computers, internet terminals, notebooks, and embedded systems. Personal computer (PC) systems, such as the International Business Machines (IBM) compatible PC systems, include desk top, floor standing, or portable versions. A typical PC system is a microcomputer that includes a system processor or microprocessor, associated memory and control logic, and a number of peripheral devices that provide input and output for the system. Such peripheral devices often include display monitors, keyboards, mouse-type input devices, floppy and hard disk drives, CD-ROM drives, and printers. The number of devices being added to personal computer systems continues to grow. For example, many computer systems also include network capability, terminal devices, modems, sound devices, voice recognition devices, electronic pen devices, and mass storage devices such as tape drives, CD-ROM drives, or DVDs.

Typically, computer systems are powered by a power supply that receives and converts alternating current (AC) power to direct current (DC) power that is used to power the computer system components such as the system processor. One type of AC to DC power supply used to supply current at DC voltages, converts power from an AC power source such as 120 V, 60 Hz power from a wall outlet. This is accomplished by rectifying the voltage level of an AC power source to an unregulated bulk DC voltage. This unregulated DC voltage typically has a ripple waveform component. To "smooth" out the ripple component, most power supplies incorporate a bulk filter capacitor or bulk reservoir capacitor. Typically, a bulk filter capacitor stores charge during the ripple peaks and releases charge during the low portion of the ripple cycle. Also, AC to DC power supplies typically include a DC to DC converter (also known as a regulator) for providing DC power to the computer system within specified tolerances.

Because bulk filter capacitors can store a large amount of charge at relatively high DC voltages such as at 400 VDC and higher, they must be discharged when the AC power is removed or disconnected from the power supply in order to comply with safety standards to prevent the bulk filter capacitor from becoming a shock hazard. The IEC 950 standard requires the bulk filter capacitor to be discharged to a voltage level of less than 2 VDC. One method of discharging the bulk filter capacitor when the AC power source is disconnected and AC current ceases to be supplied to the power supply is to connect a bleeder resistor in parallel with the bulk filter capacitor. However, a bleeder resistor continually dissipates power during the normal operation of the power supply resulting in wasted energy which appears as heat in the power supply.

To remedy the problem of wasted energy from a continuously connected bleeder resistor, some systems implement a special switch that is activated to electrically couple the bulk filter capacitor to a resistive element to discharge the bulk filter capacitor. However, these circuits generally require a separate switching element that is robust enough to handle the discharge current.

What is needed is a power supply that discharges a bulk filter capacitor in response to the removal of an external power source and accomplishes this objective with a minimal number of components.

SUMMARY OF THE INVENTION

It has been discovered that discharging a bulk filter capacitor through the main switching element of a switching power supply converter advantageously provides a power supply that utilizes existing components for a capacitor discharge path.

In one aspect, the invention includes a power supply that supplies power at a regulated DC voltage. The power supply includes an input for receiving current supplied from a power source, a bulk filter capacitor, and a switching converter coupled to the bulk filter capacitor. The switching converter providing at an output thereof, current at a regulated DC voltage level. The switching converter includes a main switching element electrically coupled to the bulk filter capacitor. During a modulation mode of the switching converter, the main switching element is made conductive and non conductive in accordance with a duty cycle to control the DC voltage level of the output. The switching converter also includes a discharge control circuit which in response to a cessation of current supplied from the power source to the input, makes the main switching element conductive at least until the bulk filter capacitor has discharged through the main switching element to a first charge level.

In another aspect, the invention includes a computer system having a system processor and a power supply. The power supply supplies current to the computer system including the system processor at a regulated DC voltage. The power supply includes an input for receiving current supplied from a power source, a bulk filter capacitor, and a first switching converter electrically coupled to the bulk filter capacitor. The first switching converter provides at an output, current at a regulated DC voltage level. The first switching converter includes a main switching element electrically coupled to the bulk filter capacitor. During a modulation mode of the first switching converter, the main switching element is made conductive and non conductive in accordance with a duty cycle to control the DC voltage level of the output. The first switching converter also includes a discharge control circuit, which in response to a cessation of current supplied from the power source to the input, makes the switching element conductive at least until the bulk filter capacitor has discharged through the main switching element to a first charge level.

In another aspect, the invention includes a method for discharging a bulk filter capacitor in a power supply. The method includes supplying current from a power source to an input of the power supply, charging a bulk filter capacitor in the power supply, and making a main switching element electrically coupled to the capacitor conductive and non conductive in accordance with a duty cycle to control the DC voltage level of an output of the power supply. The method also includes terminating the supply of current from the power source to the input, and in response to the termination of the supply of current, making conductive the main switching element to discharge the bulk filter capacitor to at least a first charge level.

In another aspect, the invention includes a power supply that supplies power at a regulated DC voltage. The power supply includes an input for receiving current supplied from a first power source, a bulk filter capacitor, and a switching converter coupled to the bulk filter capacitor. The switching converter providing at an output, current at a regulated DC voltage level, the switching converter includes a main switching element electrically coupled to the bulk filter capacitor. The main switching element is made conductive and non conductive in accordance with a duty cycle to control the DC voltage level of the output during a modulation mode. The switching converter also includes means operative, in response to a cessation of current supplied from the power source to the input, for making the main switching element conductive at least until the bulk filter capacitor has discharged through the main switching element to a first charge level.

In another aspect, the invention includes a converter control circuit that includes a pulse generator circuit, which when activated, provides a pulse signal having a duty cycle to make a switching element of a switching power supply converter conductive and non-conductive in accordance with the duty cycle to control the DC voltage level of an output of a switching power supply. The converter control circuit also includes a discharge control circuit, which when activated, provides a discharge signal to make the switching element conductive at least until a bulk filter capacitor of the power supply has discharged through the main switching element to a first charge level. The converter control circuit further includes a pulse generator activation circuit, wherein the pulse generator activation circuit activates the pulse generator circuit and wherein the pulse generator activation circuit activates the discharge control circuit in response to a cessation of current supplied from a power source to an input of the power supply.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The following sets forth a detailed description of the best contemplated mode for carrying out the invention. The description is intended to be illustrative of the invention and should not be taken to be limiting.

Figure 1:
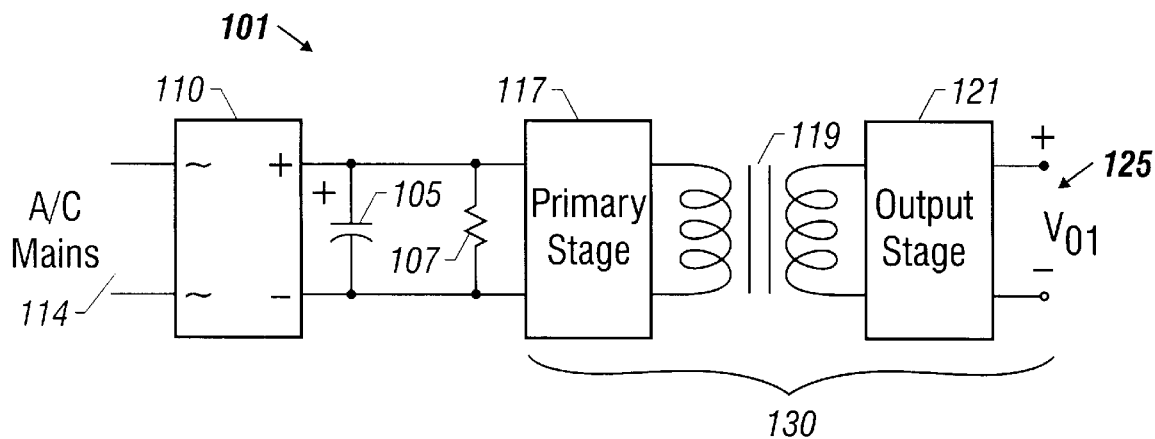
FIG. 1 is schematic of a prior art power supply incorporating a continuously connected bleeder resistor to discharge the bulk filter capacitor.

FIG. 1 is a schematic of a prior art power supply incorporating a continuously connected bleeder resistor for discharging the bulk filter capacitor. Power supply 101 is an AC to DC power supply that receives AC power from an AC power source via input 114 and converts the AC power to unregulated DC power with rectifier 10. Because the DC output voltage of rectifier 110 has a ripple component, the output voltage is typically filtered by a bulk filter capacitor 105 which stores charge or charges during the peak portion of the ripple and releases charge or discharges during the low portion of the ripple cycle. Power supply 101 includes a switching DC to DC converter 130 which incorporates a main switching element (internal to the primary stage 117) that, when the converter is in a modulation mode, alternates between a conductive and a non conductive state to control the voltage level (Vo) of the output 125. Converter 130 includes a primary stage 117, an isolation transformer 119, and an output stage 121.

A bleeder resistor 107 is connected in parallel to the bulk filter capacitor 105. When the AC power source is decoupled from the power supply, the bulk filter capacitor 105 is discharged through the bleeder resister 107. However, because the bleeder resistor is continuously connected to the bulk filter capacitor 105 and rectifier 110, power is dissipated by the bleeder resistor 107 during the normal operation of the power supply when the power supply is in the modulation mode.

Figure 2:
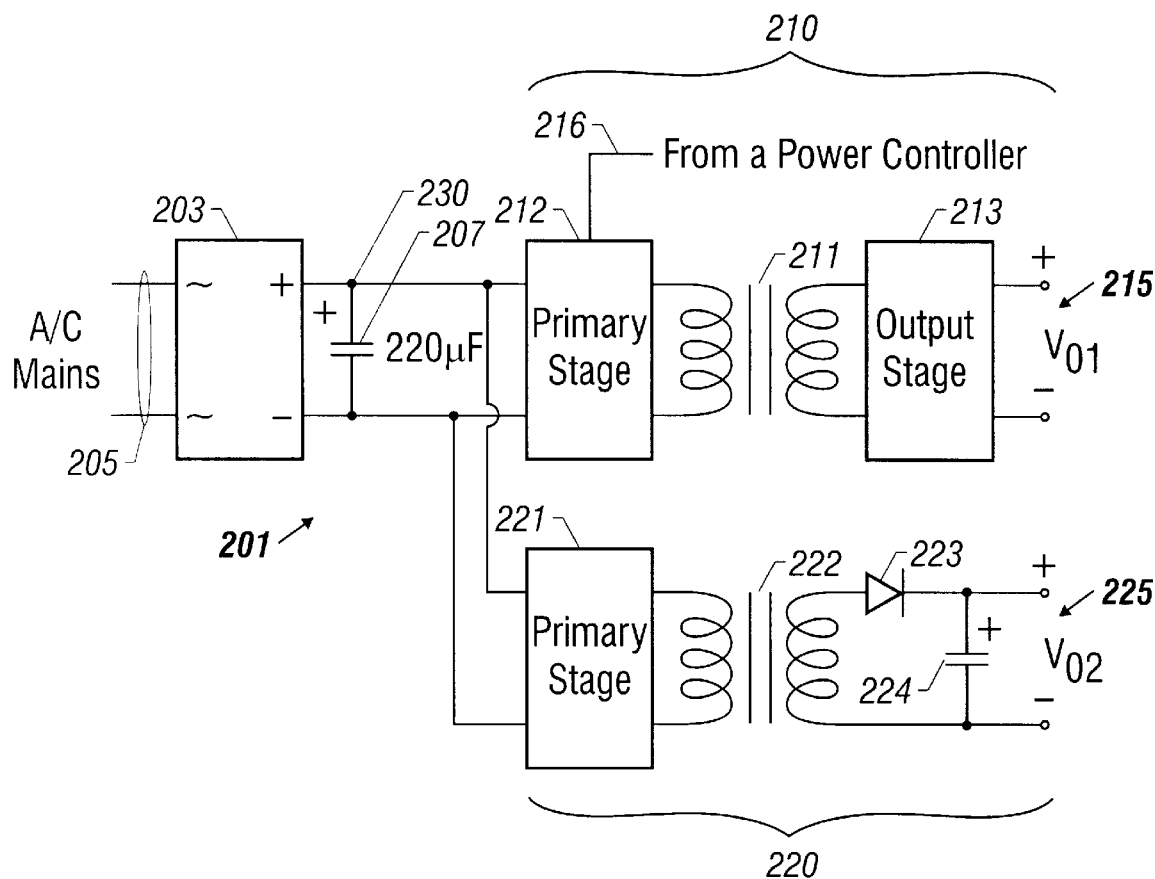
FIG. 2 is a schematic is of one embodiment of a power supply according to the present invention.

FIG. 2 is a schematic diagram of one embodiment of a power supply according to the present invention. Power supply 201 includes a rectifier 203 having an input 205 for receiving AC power supplied from an AC power source such as a 120 VAC, 60 Hz outlet. Electrically connected to the output of rectifier 203 is a 220 micro farad, 400 VDC bulk filter capacitor 207 for smoothing out the ripple component of the output of rectifier 203. The size of bulk filter capacitor 207 may vary depending upon the power output and hold up time of power supply 201.

Power supply 201 includes two switching DC to DC converters, a primary converter 210 and a secondary converter 220. The primary converter supplies current at its output 215 at a regulated DC voltage (Vo1) to a voltage rail in a computer system to power the computer system, including the system processor, during normal use of the computer system. The secondary or "standby" converter 220 powers the computer system when the computer system is operating in a "sleep" state. This sleep state occurs during a period of low CPU or system processor activity during which a minimal amount of power is consumed. In some embodiments, secondary converter 220 is a "flea power" converter.

One example of a computer system operating in a sleep state is with a "wake-on-LAN" system. In such a system, when a personal computer system coupled to a local area network (LAN) is not being used, the computer system is still operating to receive data packets via the LAN.

Some operating standards for power supplies set limits on the power consumed during a sleep state. One such standard is the "Blue Angle" standard which limits the power consumed by the power supply to 5 watts or less. Because DC to DC converters typically operate more efficiently at designed loads, implementing the smaller standby converter 220 to power the computer system during periods of inactivity reduces the power wasted during a sleep state and thereby allows a greater portion of the 5 watts to be utilized by the computer system. Implementing a bleeder resistor (similar to resistor 107 of FIG. 1) in power supply 201 would continuously dissipate approximately 1 watt of power during the operation of the power supply. Thus, for a computer system striving to meet the 5 watt standard, 20% of the power ould be consumed by the bleeder resistor if incorporated into the power supply of FIG. 2. Consequently, by not implementing a continuously connected resistor, power supply 201 is more efficient and is able to provide more power to the computer system during a sleep mode.

Primary converter 210 includes a primary stage 212, an isolation transformer 211, and an output stage 213. The primary stage 212 includes a main switching element (internal to the primary stage 212) that, when the converter 210 is enabled and in a modulation mode, alternates between a conductive and a non conductive state to control the voltage level (Vo1) of the output 215. The primary converter is disabled during a sleep state via a power state control signal 216 which in the embodiment shown, is provided by a power supply controller (item 525 on FIG. 5).

The standby converter 220 includes a primary stage 221, an isolation transformer 222, and an output stage which in the embodiment shown includes a diode 223 and an output stage filter capacitor 224. The standby converter 220 is enabled during both the normal operation state and the sleep state of the computer system.

In the embodiment shown, the primary converter 210 is a switching converter that conforms to the forward converter topology, and the standby converter 220 is a switching converter that conforms to the fly-back converter topology. In other embodiments, converters 210 and 220 may conform to other switching converter topologies such as the boost, buck, or push-pull converter topologies. Examples of switching converter topologies may be found in *Switching Power Supply Design* by Abraham Pressman, McGraw-Hill, Inc., 1991. It is understood that a "switching converter" also includes those converter or regulator topologies that do not implement isolation transformers. Also in other embodiments, converters 210 and 220 may include multiple output stages whose outputs are at different regulated voltage levels.

Figure 3:
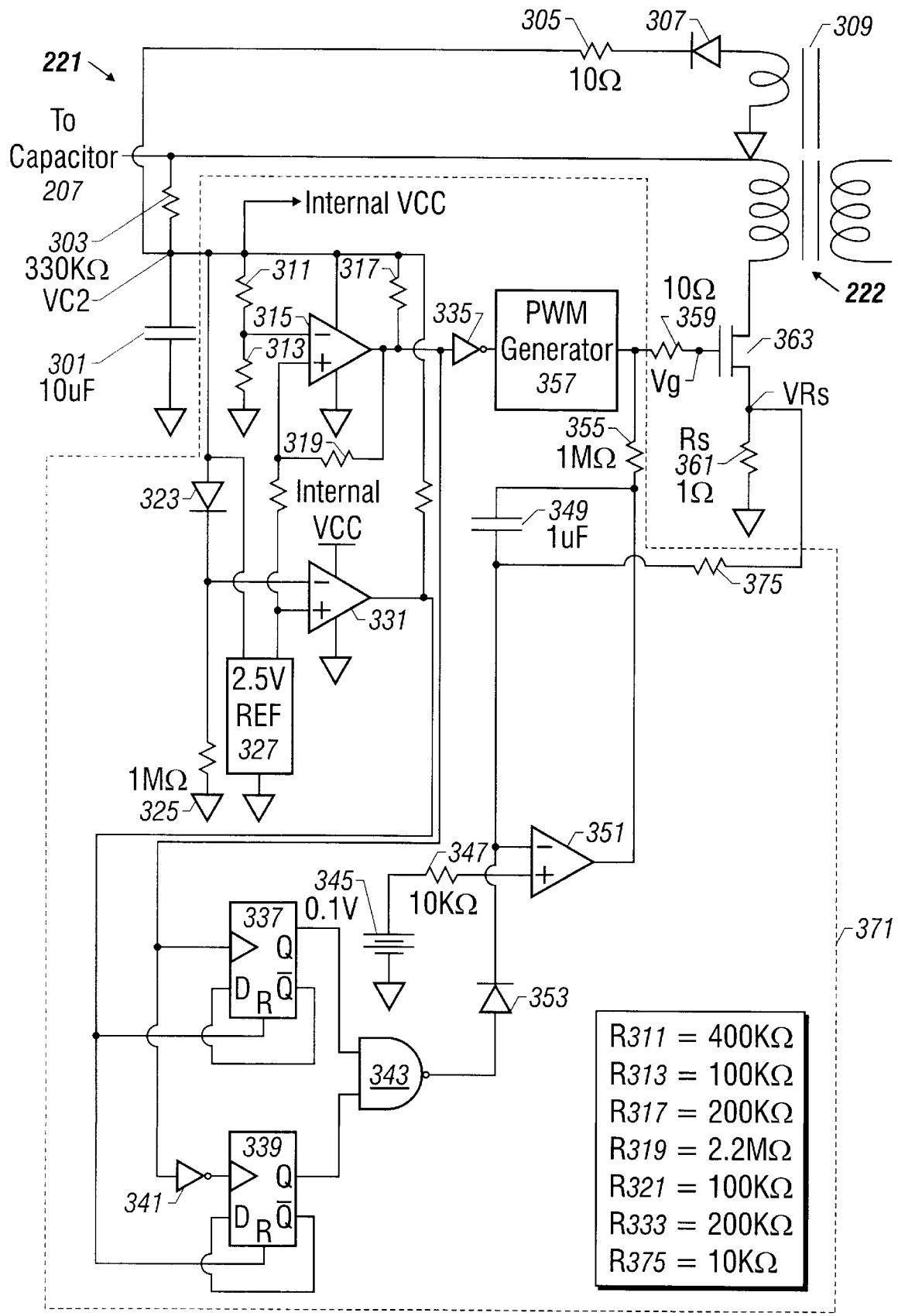
FIG. 3 is a schematic of one embodiment of a primary stage of a switching converter according to the present invention.

FIG. 3 shows a schematic diagram of one embodiment of a primary stage of a switching converter according to the present invention. More specifically, FIG. 3 shows a schematic diagram of primary converter stage 221. Primary converter stage 221 is connected to the primary side of isolation transformer 222. The primary stage 221 of converter 220 includes a main switching element 363, which in the embodiment shown is an N channel type, metal oxide semiconductor field effect transistor (MOSFET) whose gate is connected to resistor 359. The drain of FET 363 is connected to a terminal of the primary side of transformer 222 and the source of FET 363 is connected to sense resistor 361. In other embodiments, other components such as a bipolar transistor or other types of FETs may be used as the main switching element.

Primary stage 221 also includes a pulse width modulated (PWM) signal generator circuit 357, that when activated, provides a pulse width modulated signal having a duty cycle to the control input of the main switching element 363 to make the main switching element 363 conductive and non conductive in accordance with the duty cycle to control the voltage level (Vo2) of the output 225 of the secondary converter 220. The PWM generator circuit 357 includes an input for receiving the activation signal from inverter 335 to activate the pulse generator circuit. The pulse generator circuit 357 also includes a second input (not shown) for receiving a duty cycle control signal that is dependent upon the voltage level of the output 225 of the secondary converter 220 for adjusting the duty cycle of the pulse width modulated signal to correspondingly adjust the voltage level of the output 225. In other embodiments, the PWM generator circuit may include a 555 timer circuit.

The primary stage 221 includes a PWM activation signal circuit that monitors a voltage level (node VC2) indicative of whether the AC power source is supplying current to rectifier 203 to detect a cessation of current supplied from the AC power source. The PWM activation circuit includes an operational amplifier (op amp) 315 and resistors 317, 311, 313, 319 and 321, and inverter 335 for providing the activation signal at the output of inverter 335 to the pulse generation circuit 357 to activate the pulse generation circuit. The PWM activation signal circuit has a hysteresis characteristic in that the output of op amp 315 goes low when the voltage level of node VC2 rises above a first trip level of 15 VDC from a low voltage level during the startup mode of the converter 220 indicating that current is being supplied to rectifier 203 from an AC power source and the output of op amp 315 goes high when the voltage level of node VC2 falls below a second trip level of 12 VDC as when the AC power source ceases to supply current to the rectifier 203 when the converter is in the modulation mode. In other embodiments, the first trip level and/or second trip level may be varied by varying resistance values of resistors 311, 313, 317, 319, and 321.

The primary stage 221 also includes a reset circuit that provides a reset pulse at the output of op amp 331 during the initial supplying of current to the rectifier from the AC power source.

The primary stage 221 includes a current limiting circuit that includes op amp 351, capacitor 349, resisters 347 and 375 and a 0.1 voltage source 341. The current limiting circuit provides a control signal at the output of op amp 351 to the control input or the gate of switching element 363 through the one mega ohm resistor 355 and the ten ohm gate resistor 359 to make the switching element 363 conductive in the linear range to control the discharge current from the bulk filter capacitor 207 during the discharging of the bulk filter capacitor.

The primary stage 221 also includes a state machine for initiating the main switching element to be made conductive in response to the cessation of current supplied from the AC power source. The state machine includes D flip flops 337 and 339, inverter 341, and Nand gate 343. The output of Nand gate 343 controls the activation of the current limiting circuit. In other embodiments, other logical circuits may be used to implement the state machine.

In FIG. 3, the PWM signal generator 357, the current limiting circuit, the state machine, the PWM activation circuit, and the reset circuit are integrated on a semiconductor PWM integrated chip (PWMIC) as indicated by the dashed line. In the embodiment of FIG. 3, the devices and circuits of PWMIC 371 such as the Nand gates, op amps, and flip flops shown in FIG. 3 are implemented with the use of field effect transistors (FETs) fabricated on a semiconductor substrate. Because capacitor 207 is discharged via the main switching element 363, the PWMIC 371 requires only one output terminal (connected to resistor 359) for providing a PWM signal to control the conductivity of the main switching element during the modulation mode and to provide a discharge control signal to the main switching element to control the discharge current from the bulk filter capacitor 207 through the main switching element 363 to discharge the bulk filter capacitor 207. Another advantage of discharging the bulk filter capacitor through the main switching element is that the power supply does not require an additional "high current" switching element capable of handling the high discharge current of the bulk filter capacitor. Thus, the size, complexity, and expense of a power supply implementing the present invention is reduced.

PWMIC 371 is powered via an input terminal connected to node VC2. The voltage level of node VC2 is dependent upon the charge level of a 20 volt, 10 micro Farad capacitor 301. When current is initially supplied to the power supply from the AC power source, capacitor 301 is initially charged by charge current from rectifier 203 via a current path that includes resistor 303. However, during the modulation mode operation of the converter 220, current is supplied from a tertiary winding 309 of isolation transformer 222 via a low impedance path that includes diode 307 and resistor 305. Because the secondary supply is via a low impedance path, the secondary supply provides the majority of current to the PWMIC 371 during the modulation mode.

Figure 4A:
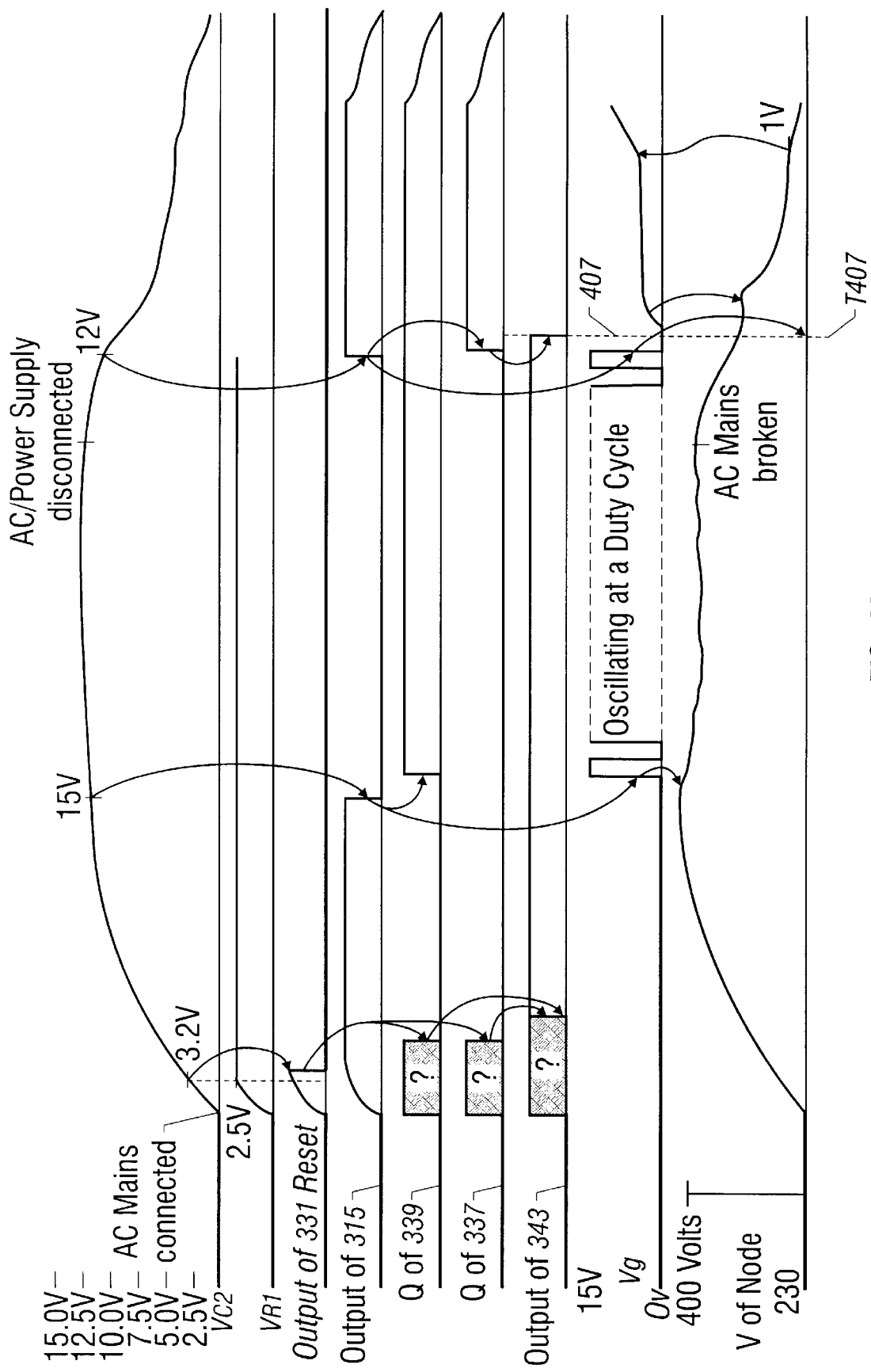
FIG. 4A is a timing diagram of the operation of one embodiment of a power supply according to the present invention.
Figure 4B:
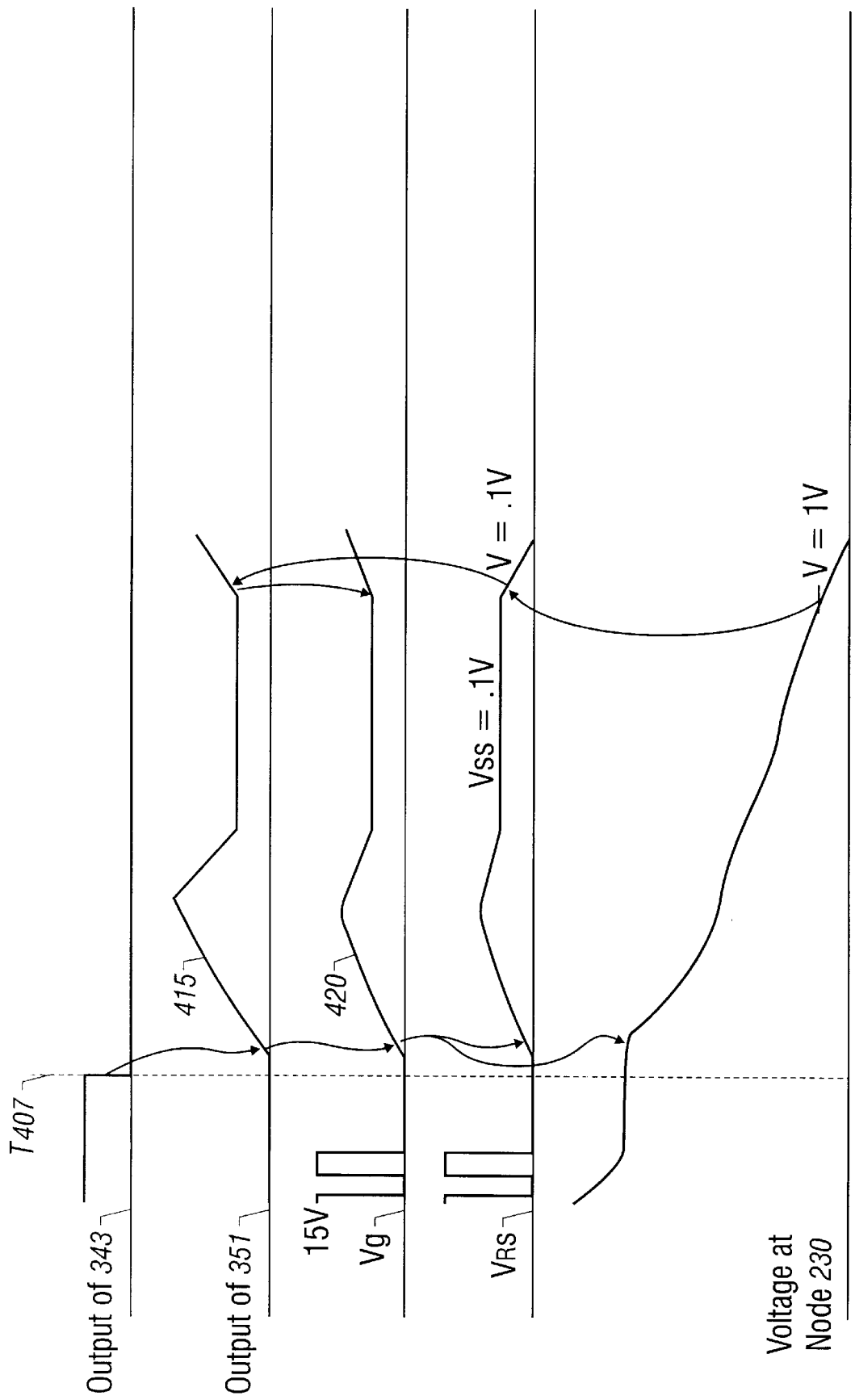
FIG. 4B is a timing diagram of the operation of one embodiment of a power supply according to the present invention.

FIGS. 4A and 4B show timing diagrams of the operation of one embodiment of a power supply according to the present invention. Referring to FIG. 4A, when the AC power source has been electrically decoupled from the input terminals of rectifier 203 for an extended period of time, all voltage levels are initially at zero volts. When the AC mains are electrically connected to the input terminals of rectifier 203 and the AC power source begins supplying current to rectifier 203, the power supply enters a start up mode where the DC current from rectifier 203 charges capacitor 207 and charges capacitor 301 via resistor 303. As capacitor 301 charges, the voltage level at node VC2 rises accordingly. Once the voltage level of VC2 rises to 15 VDC, the output of op amp 315 goes low to activate the PWM generator circuit 357 via inverter 335 and the power supply enters the modulation mode. When activated, the PWM generator circuit produces a pulse width modulated signal to make conductive and non conductive switching element 363 in accordance with the duty cycle of the of the PWM signal. As long as the AC power source is supplying current to rectifier 203, the power supply continues to operate in the modulation mode.

Because the 2.5 VDC voltage source 327 includes a shunt regulator, the voltage level of node VR1 during the initial portion of the startup mode is approximately equal to the voltage level of node VC2 until the voltage level of Node VC2 exceeds 2.5 VDC. Because the inverting input terminal of op amp 331 is coupled to node VC2 via diode 323, the voltage level of inverting terminal is approximately a diode drop (0.7 VDC) lower than the voltage level of VC2, and accordingly, during the initial portion of the start up mode, 0.7 VDC lower than the voltage level of node VR1, which is connected to the non inverting terminal of op amp 331. Consequently, during the initial startup of the converter, the output of op amp 331 will be at a positive voltage (and will rise as the PWMIC VCC voltage level rises) until the voltage level of node VC2 exceeds approximately 3.2 VDC. At this point, the output voltage of op amp 331 transitions to a low voltage level or zero volts. Because, the output of op amp 331 is connected to the reset inputs of flip flops 337 and 339, the initial positive "pulse" provided by the output of op amp 331 during the startup of the converter resets flip flops 337 and 339 to place the flip flops, and therefore the state machine formed by flip flops 337 and 339, in a known state during the startup mode of the converter. Resetting flip flops 337 and 339 causes the output of Nand gate 343 to transition to a high voltage level from an unknown state which causes the output of op amp 351 to transition to a low voltage level from an unknown level to ensure that the current limiting circuit does not cause the switching element 363 to conduct during the remainder of the startup of converter 220 and during the modulation mode.

During the startup mode, the voltage level of node VC2 reaching the trip level of 15 VDC causes the output of op amp 315 to go low. In addition to activating the PWM generator circuit 357 via inverter 335, a low voltage on the output of op amp 315 also clocks flip flop 339 via inverter 341. Because the D input of flip flop 339 is connected to the /Q output of flip flop 339, clocking flip flop 339 causes the Q output of flip flop 339 to transition to a high voltage level. Since each input of Nand Gate 343 is connected to a Q output of a flip flop (337 or 339), the Q output of flip flop 339 transitioning to a high voltage level during the start of the power converter 220 entering the modulation mode does not change the output of Nand gate 343.

When in the modulation mode, converter 220 provides at output 225 current at a regulated DC voltage (Vo2). If the primary converter 210 is also enabled via the power state control signal 216, then the primary converter 210 is also in the modulation mode wherein converter 210 provides at output (Vo1) current at a regulated DC voltage.

In response to a cessation or termination of current supplied from the AC power source to the input of rectifier 203 during the modulation mode of converter 220, converter 220 makes conductive switching element 363 to discharge bulk filter capacitor 207 to a charge level as required by various safety standards. More specifically, when the current from the AC power source ceases to be supplied to rectifier 203, the voltage level of node 230 decreases as the pulse generator circuit 357 continues to make conductive and non conductive the switching element 363. Because rectifier 203 is no longer is supplying current to charge the bulk filter capacitor 207, the charge level of capacitor 207 decreases each time the switching element is made conductive via a pulse from the PWM generator 357. In addition, the cessation of current supplied from the AC power source to the rectifier 203 also causes the voltage level of node VC2 to decrease in that the voltage level of node VC2 is indicative of current being supplied to the power supply from the AC power source. Although primary converter stage 221 determines whether the AC power source is supplying current to the rectifier 203 by monitoring the voltage level of the PWMIC power input VCC terminal (node VC2), in other embodiments, other circuits may be utilized that to detect the cessation of the current supplied to the rectifier from the AC power source, such as a circuit providing a discrete signal indicating such a condition. One advantage of monitoring the voltage level of the PWMIC power input to determine a cessation of current supplied from the AC power source to the power supply is that the discharge control circuit will not operate to make the main switching element conductive due to a monetary power outage of the AC power source.

When the voltage level of node VC2 has decreased past a second trip level of 12 VDC after the cessation of current from the AC power source, the output of op amp 315 goes high to deactivate the PWM generator 357 via inverter 335 wherein the PWM generator 357 ceases to provide pulses to the gate of switching element 363 to make the switching element conductive and non conductive. At this time, converter 220 is no longer in the modulation mode. Because the PWM generator 357 has stopped providing pulses to the gate of switching element 363, the switching element is non conductive and therefore the bulk filter capacitor is not discharging. The output of op amp 315 going high changes the state of the state machine by clocking flip flop 337 which causes the output of Nand gate 343 to go low at time 407 initiating the making conductive switching element 363 to discharge the bulk filter capacitor to a charge level that meets safety standards.

Referring to FIG. 4B, at time 407, the output of Nand gate 343 transition from a high voltage level to a zero voltage level causes the output of op amp 351 to rise in that the voltage level of the non inverting input of op amp 351 is now at a higher voltage level (0.1 VDC from voltage source 345) than the inverting input. The rate of rise of the output of op amp 351 (slope 415) is controlled by the resistor-capacitor (RC) circuit that includes resistor 375 and capacitor 349.

The rise in the voltage level of the output of op amp 351 causes the voltage level of node (Vg) at the gate of the switching element 363 to rise. The gate capacitance of the switching element 363 and resistors 355 and 359 form a second RC circuit that causes the voltage level of node Vg to rise at a slower rate (slope 420) than the rate of rise of the output of op amp 351 (slope 415). This slower rate of rise in the voltage of the gate of element 363 ensures that that current limiting device is stable in its operation and does not oscillate.

The rise in the gate voltage of node (Vg) causes the switching element 363 to become conductive. During the rise in the gate voltage, the voltage level of the gate is below a threshold voltage level of the switching element 363 such that FET 363 operates in the linear range (as opposed to being conductive substantially in the non linear range during the "on" portion of the duty cycle when FET 363 is made conductive by the PWM signal provided by the PWM generator 357 during the modulation mode). Consequently, the amount of discharge current from capacitor 207 generally increases proportionally to the increase in the voltage at the gate of FET 363. As the discharge current through FET 363 increases, the voltage level at node VRs rises proportionally as well.

The voltage level of the output of op amp 351 (and the voltage levels at node Vg and node VRs) continues to rise until the voltage level at node VRs exceeds approximately 0.1 VDC wherein the voltage level of the inverting input of op amp 351 exceeds the voltage level of the non inverting input. At this point the voltage level of the output of op amp 351 declines which decreases the conductivity of FET 363 until the voltage level of node VRs decreases below 0.1 VDC. Eventually the voltage level of node VRs stabilizes at a steady state value of 0.1 VDC until the voltage level of bulk filter capacitor 207 (node 230) discharges below 1 VDC. When the voltage level of node VRs is at the steady state value, the discharge current through FET 363 is at a steady state value of 100 mA. Limiting the discharge current through FET 363 ensures that the FET 363 is not damaged by a continuously high discharge current.

When the voltage level of node 230 decreases past 1 volt DC, the bulk filter capacitor can no longer provide enough discharge current to maintain the voltage level of node VRs at 0.1 VDC. Consequently, the voltage level at the inverting input of op amp 351 decreases causing the output of op amp 351 to rise until capacitor 301 has discharged. However, because the charge level of bulk filter capacitor 207 has decreased below 1 VDC, the current flowing through switching element 363 does not increase accordingly.

In other embodiments, operating parameters of the discharge control circuit such as the steady state discharge current through the switching element, the voltage level of the bulk capacitor when the output of op amp 351 rises after being at a steady state, and the rate of rise of the discharge current may all be varied by varying the values of resistors 361, 375, 347, 355, and 359, capacitor 349, and/or voltage source 345.

Referring back to FIG. 2, primary converter stage 212 also includes a PWM generator circuit (similar to item 357 but not shown in FIG. 2) and a capacitor (similar to capacitor 301 but not shown in FIG. 2). After a cessation in current supplied from the AC power source to the input of rectifier 203, the voltage level of the capacitor similar to capacitor 301 in primary stage 212 decreases past a second trip level, wherein if converter 210 is enabled, converter 210 leaves the modulation mode. However, because primary stage 212 does not include a discharge control circuit including a current limiting circuit and state machine, bulk filter capacitor 207 is not discharged through the main switching element (not shown in FIG. 2) of converter 210. In other embodiments, both the primary converter and the secondary converter include discharge control circuits.

Figure 5:
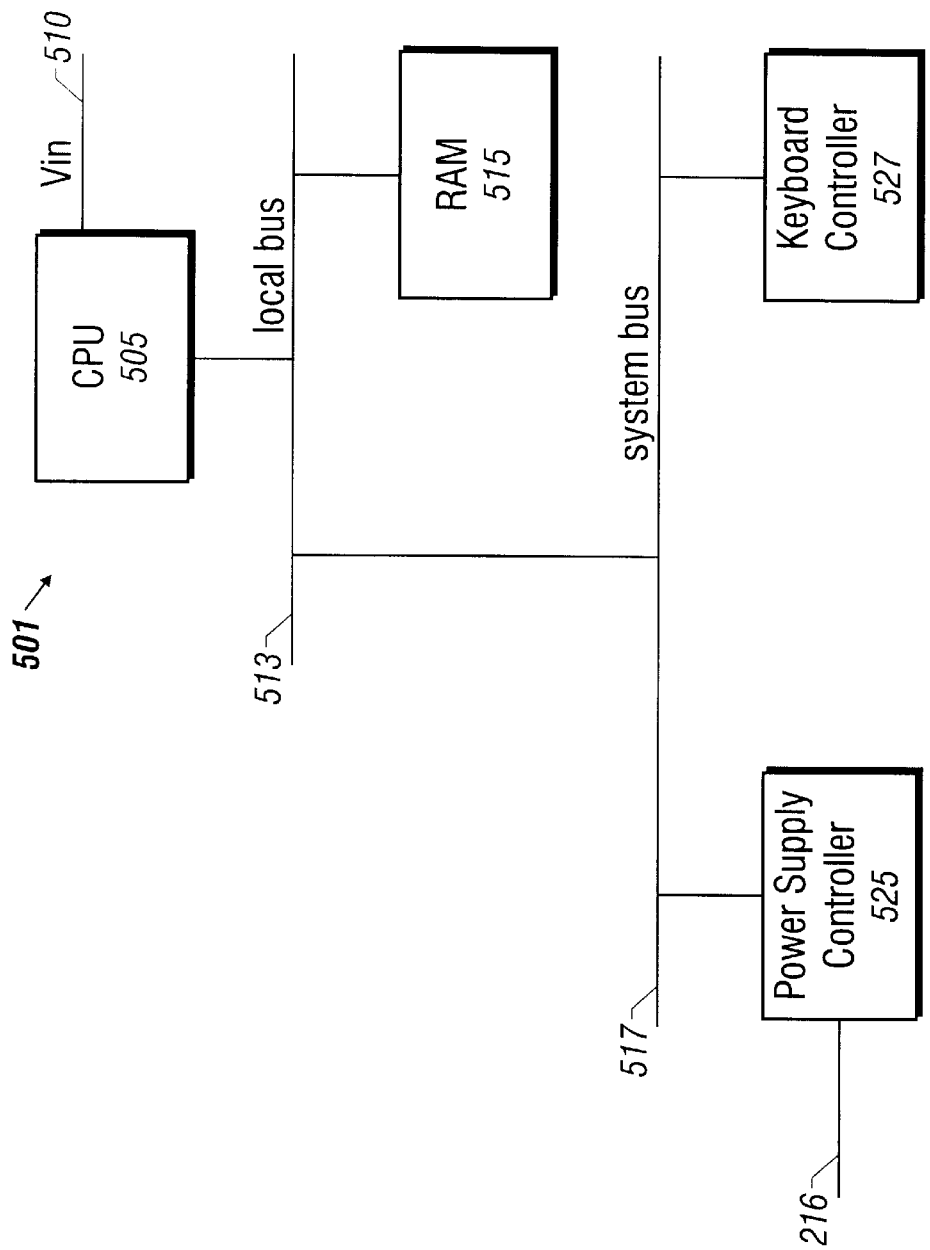
FIG. 5 is a block diagram of one embodiment of a computer system according to the present invention.

FIG. 5 is a block diagram of one embodiment of a computer system according to the present invention. In the embodiment shown, computer system 501 is a personal computer system with a system central processing unit (CPU) or system processor 505. CPU 505 is powered by a power supply via a Vin pin 510 that is connected to a power rail electrically coupled to output 215 of the power supply 201 (See FIG. 2). In one embodiment, CPU 505 is an X86 compatible processor. Computer system 501 also includes a RAM 515 connected to the CPU 505 via a local bus 513. Computer system 501 includes a keyboard controller 527 and a power supply controller 525 connected to the CPU 505 via a system bus 517 and local bus 513. Power supply controller 525 provides at an output the power state control signal 216 (see FIG. 2) which disables the primary power converter 210 during the sleep state.

In other embodiments, a power supply includes only one converter similar to the converter shown in FIG. 3. In these embodiments, the single converter would include the discharge control circuit including the current limiting circuit.

In other embodiments, the circuit shown in FIG. 3 may be used with other converter topologies such as the forward converter topology and the boost converter topology. With a boost converter, the main switching element would be electrically coupled to the bulk filter capacitor via an inductor.

While particular embodiments of the present invention have been shown and described, it will be obvious to those skilled in the art that changes and modifications may be made without departing from this invention and its broader aspects and, therefore, the appended claims are to encompass within their scope all such changes and modifications as are within the true spirit and scope of this invention.

What is claimed is:

1. A power supply supplying power at a regulated DC voltage, comprising:
   an input for receiving current supplied from a power source;
   a bulk filter capacitor;
   a switching converter coupled to the bulk filter capacitor, the switching converter providing at an output thereof, current at a regulated DC voltage level, the switching converter including:
   a main switching element electrically coupled to the bulk filter capacitor, wherein during a modulation mode of the switching converter, the main switching element is made conductive and non conductive in accordance with a duty cycle to control the DC voltage level of the output;

a discharge control circuit which in response to a cessation of current supplied from the power source to the input, makes the main switching element conductive at least until the bulk filter capacitor has discharged through the main switching element to a first charge level.

2. The power supply of claim 1 wherein the main switching element is coupled to the bulk filter capacitor via an inductive element, wherein the bulk filter capacitor is connected to one end of the inductive element and the main switching element is connected to another end of the inductive element.

3. The power supply of claim 2 wherein the inductive element is an inductor.

4. The power supply of claim 2 wherein the inductive element is a primary winding of an isolation transformer.

5. The power supply of claim 1 wherein the switching element is a transistor.

6. The power supply of claim 1 wherein the switching element is a MOSFET.

7. The power supply of claim 1 wherein the first charge level is less than 2 volts DC.

8. The power supply of claim 1 further comprising:
a pulse generator circuit providing a pulse signal having the duty cycle to a control input of the switching element to make the switching element conductive and non conductive in accordance with the duty cycle during the modulation mode of the switching converter;
wherein the discharge control circuit provides a discharge signal to the control input of the switching element after cessation of the modulation mode to make the switching element conductive to discharge the bulk filter capacitor to at least the first charge level.

9. The power supply of claim 8 wherein the pulse generator circuit and he discharge control circuit are implemented on an integrated circuit chip.

10. The power supply of claim 1 wherein the main switching element is a transistor that is conductive in a linear range and in a non linear range, wherein when the transistor is made conductive during the on portion of the duty cycle during the modulation mode, the transistor is conductive substantially in the nonlinear range, were in the transistor is conductive in the linear range when the discharge control circuit makes the transistor conductive to discharge the bulk filter capacitor.

11. The power supply of claim 1 wherein the discharge control circuit includes a current limiting circuit limiting the discharge current through the main switching element during the discharging of the bulk filter capacitor.

12. The power supply of claim 11 wherein the current limiting circuit includes a resistor capacitor (RC) circuit to control the rate that the main switching element is made conductive to discharge the bulk filter capacitor in response to the cessation of current supplied from the power source.

13. The power supply of claim 1 wherein the discharge control circuit includes a state machine circuit to provide a signal to initiate the making of the main switching element conductive in response to the cessation of the modulation mode.

14. The power supply of claim 13 wherein the discharge control circuit includes a reset circuit for resetting the state machine circuit in response to the initial supplying of current to the input from the power source.

15. The power supply of claim 1 further comprising:
a rectifier having an input electrically coupled to the input of the power supply and having an output electrically coupled to the bulk filter capacitor;

wherein the power source is an AC power source.

16. The power supply of claim 1 wherein the switching converter includes a node, wherein the voltage level of the node falling below a trip level is indicative of the cessation of current supplied from the power source, wherein in response to the voltage level of the node falling below the trip level, the discharge control circuit makes the main switching element conductive at least until the bulk filter capacitor has discharged through the main switching element to the first charge level.

17. A computer system comprising:
a system processor;
a power supply, the power supply supplying current to the computer system including the system processor at a regulated DC voltage, the power supply including:
an input for receiving current supplied from a power source;
a bulk filter capacitor;
a first switching converter electrically coupled to the bulk filter capacitor, the first switching converter providing at an output, current at a regulated DC voltage level, the first switching converter including:
a main switching element electrically coupled to the bulk filter capacitor, wherein during a modulation mode of the first switching converter, the main switching element is made conductive and non conductive in accordance with a duty cycle to control the DC voltage level of the output;
a discharge control circuit, which in response to a cessation of current supplied from the power source to the input, makes the switching element conductive at least until the bulk filter capacitor has discharged through the main switching element to a first charge level.

18. The computer system of claim 17, wherein the power supply further includes:
a second switching converter coupled to the bulk filter capacitor, the second switching converter providing at an output, current at a regulated DC voltage, the second switching converter including:
a switching element, wherein during a modulation mode of the second switching converter, the switching element being made conductive and non conductive in accordance with a duty cycle to control the DC voltage level of the output of the second converter.

19. The computer system of claim 18, further comprising:
a power supply controller providing a power state control signal to enable and disable the second switching converter.

20. The computer system of claim 18 wherein:
the power supply operates in a first state and in a second state;
in the first state, both the first switching converter and the second switching converter are enabled;
in the second state, the first switching converter is enabled and the second switching converter is disabled.

21. The power supply of claim 17 wherein the main switching element is coupled to the bulk filter capacitor via an inductive element, wherein the bulk filter capacitor is connected to one end of the inductive element and the main switching element is connected to another end of the inductive element.

22. The power supply of claim 21 wherein the inductive element is an inductor.

23. The power supply of claim 21 wherein the inductive element is a primary winding of an isolation transformer.

24. The power supply of claim 17 wherein the switching element is a transistor.

25. The power supply of claim 17 wherein the switching element is a MOSFET.

26. The power supply of claim 17 wherein the first charge level is below 2 VDC volts.

27. The power supply of claim 17 further comprising:
a pulse generator circuit providing a pulse signal having the duty cycle to a control input of the switching element to make the switching element conductive and non-conductive in accordance with the duty cycle during the modulation mode;
wherein the discharge control circuit provides a discharge signal to the control input of the switching element after a cessation of the modulation mode to make the switching element conductive to discharge the bulk filter capacitor to at least the first charge level.

28. The power supply of claim 27 wherein the pulse generator circuit and the discharge control circuit are implemented in an integrated circuit.

29. The power supply of claim 17 wherein the discharge control circuit includes a current limiting circuit, the current limiting circuit limiting the discharge current through the main switching element during the discharging of the bulk filter capacitor.

30. The power supply of claim 29 wherein the discharge control circuit includes a state machine circuit to provides a signal to initiate the making of the main switching element conductive in response to the cessation of the modulation mode.

31. The power supply of claim 30 wherein the discharge control circuit includes a reset circuit for resetting the state machine circuit in response to the initial supplying of current to the input from the power source.

32. The computer system of claim 17 further comprising:
a pulse generator circuit, when activated, providing a pulse signal having the duty cycle to a control input of the switching element to make the switching element conductive and non conductive in accordance with the duty cycle during the modulation mode;
a pulse generator activation circuit having an input for monitoring a voltage level indicative of the input of the power supply receiving current supplied from the first power source, wherein the first voltage level rises above a first trip level in response to the power source supplying current to the input, wherein the first voltage level falls below a second trip level in response to the cessation of current supplied from the power source;
wherein the pulse generator activation circuit activates the pulse generator circuit in response to the first voltage level rising above the first trip point;
wherein the pulse generator activation circuit activates the discharge control circuit to discharge the bulk filter capacitor in response to the first voltage level falling below the second trip level.

33. A method for discharging a bulk filter capacitor in a DC power supply comprising:
supplying current from a power source to an input of the power supply;
charging a bulk filter capacitor in the power supply;
making a main switching element electrically coupled to the capacitor conductive and non conductive in accordance with a duty cycle to provide current at a regulated DC voltage level at an output of the power supply;
terminating the supply of current from the power source to the input;
in response to the termination of the supply of current, making conductive the main switching element to discharge the bulk filter capacitor to at least a first charge level.

34. The method of claim 33 further comprising:
monitoring a first voltage level indicative of the supply of current from the power source, wherein the first voltage level rises above a first trip level in response to the power source supplying current to the input, wherein the first voltage level falls below a second trip level in response to the termination of the supply of current from the power source;
initiating the making conductive and non conductive the main switching element in response to the first voltage level rising above the first trip point;
initiating the making conductive the main switching element to discharge the bulk filter capacitor in response to the first voltage level falling below the second trip level.

35. The method of claim 33 further comprising:
controlling with a resistor capacitor (RC) circuit, the rate that the main switching element is made conductive to discharge the bulk filter capacitor.

36. A power supply supplying power at a regulated DC voltage, comprising:
an input for receiving current supplied from a first power source;
a bulk filter capacitor;
a switching converter coupled to the bulk filter capacitor, the switching converter providing at an output, current at a regulated DC voltage level, the switching converter including:
a main switching element electrically coupled to the bulk filter capacitor, the main switching element being made conductive and non conductive in accordance with a duty cycle to control the DC voltage level of the output during a modulation mode;
means operative, in response to a cessation of current supplied from the power source to the input, for making the main switching element conductive at least until the bulk filter capacitor has discharged through the main switching element to a first charge level.

37. A converter control circuit comprising:
a pulse generator circuit, which when activated, provides a pulse signal having a duty cycle to make a switching element of a switching power supply converter conductive and non-conductive in accordance with the duty cycle to control the DC voltage level of an output of a switching power supply;
a discharge control circuit, which when activated, provides a discharge signal to make the switching element conductive at least until a bulk filter capacitor of the power supply has discharged through the main switching element to a first charge level;
a pulse generator activation circuit, wherein the pulse generator activation circuit activates the pulse generator circuit and wherein the pulse generator activation circuit activates the discharge control circuit in response to a cessation of current supplied from a power source to an input of the power supply.

38. The converter control circuit of claim 37 wherein:
the pulse generator activation circuit has an activation input for monitoring a first voltage level indicative of the input of the power supply being supplied with current from the power source, wherein the first voltage level rises above a first trip level in response to the power source supplying current to the input, wherein the first voltage level falls below a second trip level in response to the cessation of current supplied from the power source;

wherein the pulse generator activation circuit activates the pulse generator circuit in response to the first voltage level rising above the first trip point;

wherein the pulse generation activates the discharge control circuit to discharge the bulk filter capacitor in response to the first voltage level falling below the second trip level.

39. The converter control circuit of claim 38 wherein:

the converter control circuit is implemented on an integrated circuit chip having a power input, the chip being powered via the power input;

the first voltage level is directly proportional to the voltage level of the power input.

40. The converter control circuit of claim 37 wherein the discharge control circuit includes:

a current limiting circuit for limiting the discharge current through the main switching element during the discharging of the bulk filter capacitor.

41. The converter control circuit of claim 40 wherein the current limiting circuit includes:

an operational amplifier circuit having a first input, a second input, and an output, the voltage level of the first input is dependent upon a first DC voltage source, the voltage level of the second input is dependent upon a node having a voltage level directly proportional to the flow of current through the switching element, the discharge signal is dependent upon the voltage level of the output of the operational amplifier circuit.

42. The power converter control circuit of claim 37 wherein the converter control circuit is implemented on an integrated circuit chip.

43. The converter control circuit of claim 42 wherein the integrated circuit chip is a semiconductor chip.

44. The converter control circuit of claim 37 wherein the first charge level is below 2 VDC.

* * * * *